(12) United States Patent
Haga et al.

(10) Patent No.: US 6,290,205 B1
(45) Date of Patent: Sep. 18, 2001

(54) VALVE ELEMENT AND METHOD OF MANUFACTURING THE SAME

(75) Inventors: Satoru Haga, Kariya; Shunji Kurono, Aichi, both of (JP)

(73) Assignee: Fukoku Co., Ltd., Saitama (JP)

( * ) Notice: Subject to any disclaimer, the term of this patent is extended or adjusted under 35 U.S.C. 154(b) by 0 days.

(21) Appl. No.: 09/455,689

(22) Filed: Dec. 7, 1999

(30) Foreign Application Priority Data

Dec. 22, 1998 (JP) ................................................. 10-376312

(51) Int. Cl.$^7$ ................................................... F16K 31/02
(52) U.S. Cl. ...................... 251/129.15; 251/337; 251/356
(58) Field of Search ............................. 251/129.15, 337, 251/356

(56) References Cited

U.S. PATENT DOCUMENTS

| | | | |
|---|---|---|---|
| 2,911,183 | * 11/1959 | Matthews et al. | 251/337 X |
| 3,558,098 | * 1/1971 | Puster | 251/88 |
| 3,762,436 | * 10/1973 | Clayton | 251/356 X |
| 3,815,873 | * 6/1974 | Hendrick | 251/337 |
| 3,921,670 | * 11/1975 | Clippard, Jr. et al. | 251/129.15 X |
| 4,732,362 | * 3/1988 | Morioka et al. | 251/129.15 X |
| 4,890,815 | * 1/1990 | Hascher-Reichl et al. | 251/129.15 X |
| 4,930,747 | * 6/1990 | Nakamura | 251/129.15 X |
| 5,158,263 | * 10/1992 | Shimizu et al. | 25/129.21 X |
| 5,374,029 | * 12/1994 | Bailey | 251/129.16 X |
| 5,964,446 | * 10/1999 | Walton et al. | 251/127 |
| 6,073,908 | * 6/2000 | Koga et al. | 251/337 |

FOREIGN PATENT DOCUMENTS

| | | | |
|---|---|---|---|
| 2273532 | 6/1994 | (GB) | B05B/11/00 |
| 07145873 | 11/1993 | (JP) | F16K/31/06 |
| 08220265 | 2/1995 | (JP) | G12B/3/02 |

* cited by examiner

*Primary Examiner*—Kevin Shaver
*Assistant Examiner*—John Bastianelli
(74) *Attorney, Agent, or Firm*—McCormick, Paulding & Huber LLP

(57) ABSTRACT

A valve element with a disk-shaped leaf spring carrying a movable core in a solenoid valve to open/close a valve seat. The leaf spring includes an outer peripheral ring section, a hub section having a central hole and a plurality of radially arranged arm sections connected between the ring; section and hub section. A seal of elastic material extends along the outer peripheral, ring section of the leaf spring. The movable core has a cylindrical section and an end wall section having a through central hole. The cylindrical section has a stepped section on its outer periphery adapted to be held in contact with the leaf spring. A valve seal is formed on the end wall section through vulcanization and molding, and has a main body section on the outer surface of the end wall section, a small diameter section in said through hole and a holder section connected to the main body section by the small diameter section and inner surface of the end wall section. The movable core and leaf spring are rigidly secured to each other by a thermal plastic ring engaged in a groove on the outer periphery of the movable core.

1 Claim, 6 Drawing Sheets

US 6,290,205 B1

VALVE ELEMENT AND METHOD OF MANUFACTURING THE SAME

BACKGROUND OF THE INVENTION

The present invention relates to a valve element adapted to be used in a solenoid valve and to a method of manufacturing thereof, such valve element having a disk-shaped leaf spring carrying a movable core fitted thereto.

Control valves for controlling the flow of fluid include flow rate control valves, direction control valves and pressure control valves. The flow rate control valve is designed to modify the flow rate of fluid by providing appropriate resistance to the flow by means of a valve element and the direction control valve is designed to allow or block a flow of fluid in a given direction to shift the direction of a flow of fluid also by means of a valve element, whereas the pressure control valve is adapted to regulate the pressure of the flow of fluid in a fluid circuit by means of a valve element. A solenoid valve is a kind of control valve having a valve element to be operated by means of a solenoid.

Known solenoid valves for controlling the flow rate of fluid flowing through a flow path include the one proposed in Japanese Patent Application Laid-Open No. 7-145873. The proposed solenoid valve comprises a valve housing having two ports and a valve element fitted to the valve housing, the valve element having a valve seal adapted to take an open position for opening a valve seat and allowing the two ports to communicate with each other or take a closed position for closing the valve seat and blocking the communication therebetween.

A solenoid coil is arranged in the valve housing in order to operate the valve element. A fixed core (fixed iron core) and a movable core (movable iron core) are arranged at the center of the coil so that the valve element may be opened and closed by means of the movable core. As valve elements capable of being operated by a movable core, there has been developed a valve element provided with such movable core fitted thereto. The valve element of this type typically comprises a disk-shaped leaf spring, an outer peripheral seal arranged at the outer periphery of the leaf spring, a movable core with a cup-shaped cross section arranged in a central area of the leaf spring and a valve seal arranged at an end face of the movable core in order to open and close the valve seat.

The inventors of the present invention have studied valve bodies having a movable core fitted thereto as well as methods for manufacturing such a valve element. As a result of intensive research efforts, the inventor of the present invention invented a method of placing a leaf spring in a metal mold with a movable core held in engagement with the central hole of the leaf spring and forming a leaf spring holding section for rigidly holding the movable core and the leaf spring through vulcanization and molding at the time of forming a valve seal for an end wall section of the movable also through vulcanization and molding so that the leaf spring and the movable core may be rigidly held together by the leaf spring holding section formed integrally with the valve seal.

However, the sealing effect of a valve element relative to a valve seat may be ensured when costly fluorine rubber is only used for the valve seal but the arrangement of rigidly holding the movable core in position by means of a fluorine rubber valve seal and preparing the valve seal and the outer peripheral seal simultaneously by molding requires the valve seal to have a large capacity. Then, such a valve seal can be prepared only by using a large volume of costly and heavy fluorine rubber to consequently raise the weight of the valve element and counter all the efforts for reducing the weight of the valve element. Additionally, any attempt for rigidly holding a movable core and a leaf spring together by means of a leaf spring holding section made of expensive fluorine rubber is accompanied by an insufficient holding strength particularly when the leaf spring holding section is poorly contractible during the molding process. Then, the valve element would not be able to enjoy a long service life and the solenoid valve comprising such a valve element would lose reliability.

SUMMARY OF THE INVENTION

Therefore, an object of the present invention is to provide a highly reliable valve element that can be prepared with a reduced volume of costly fluorine rubber and hence at reduced cost and provide a method of manufacturing such a valve element.

Another object of the invention is to provide a lightweight valve element and a method of manufacturing such a valve element.

Still another object of the present invention is to provide a highly durable valve element wherein the leaf spring and the movable are rigidly held together with an enhanced level of strength and a method of manufacturing such a valve element.

According to an aspect of the invention, the above objects and other objects are achieved by providing a valve element adapted to be arranged in a solenoid valve to open and close a valve seat and comprising a leaf spring including an outer peripheral ring section, a hub section having a central hole and a plurality of radial arm sections for connecting between said outer peripheral ring section and said hub section, a ring-shaped outer peripheral seal formed by vulcanizing and molding an elastic material such as rubber along said outer peripheral ring section, a movable core having a cup-shaped cross section and including a cylindrical section and an end wall section, said end wall section being arranged at an end of the cylindrical section and having a central through hole, said cylindrical section having on its outer periphery a stepped section to be held in contact with said leaf spring and having a groove section, a valve seal arranged at said end wall section and having a main body section disposed on an outer surface of said end wall section, a small diameter section disposed in said through hole and an holding section located on an inner surface of said end wall section and connected to said main body section by way of the small diameter section and a holder ring made of thermoplastic resin and held in engagement with said groove by thermal caulking so that said leaf spring and said movable core are rigidly secured to each other by means of said holder ring.

According to another aspect of the invention, there is provided a method of manufacturing a valve element adapted to be arranged in a solenoid valve to open and close a valve seat, comprising a step of preparing a leaf spring including an outer peripheral ring section, a hub section having a central hole, and a plurality of radial arm sections for connecting between said outer peripheral ring section and said hub section, a step of forming a ring-shaped outer peripheral seal by vulcanizing and molding an elastic material such as rubber along said outer peripheral ring section, a step of preparing a movable core having a cup-shaped cross section and including a cylindrical section and an end wall section, said end wall section being arranged at an end of the cylindrical section and having a central through hole, said cylindrical section having on its outer periphery a stepped section to be held in contact with said leaf spring, a step of forming a valve seal through vulcanization and molding at said end wall, said valve seal having a main body section disposed on an outer surface of said end wall section, a small diameter section disposed in said through hole, and an holding section located on an inner surface of said end wall section and connected to said main body section by way of the small diameter section, a step of placing said movable core and said leaf spring in a thermal caulking metal mold and aligning and holding said leaf spring and said stepped section in contact with each other, a step of aligning a holder ring along an outer periphery of said movable core and a step of brining said holder ring into engagement with said groove by thermal caulking so that said leaf spring and said movable core are rigidly secured to each other by means of said holder ring.

DETAILED DESCRIPTION OF THE PREFERRED EMBODIMENT

Figure 1:
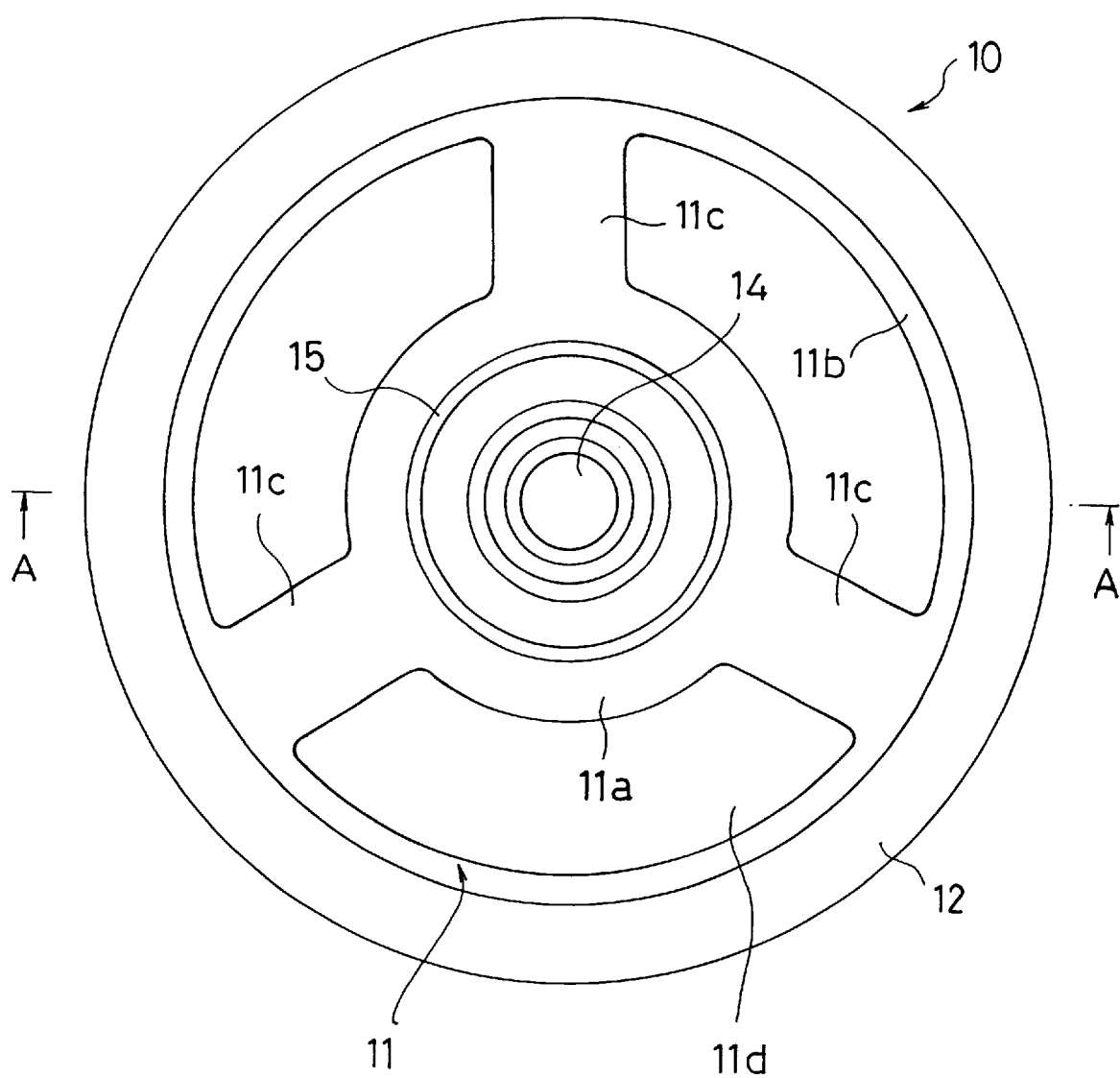
FIG. 1 is a schematic plan view of an embodiment of valve element according to the invention.
Figure 3:
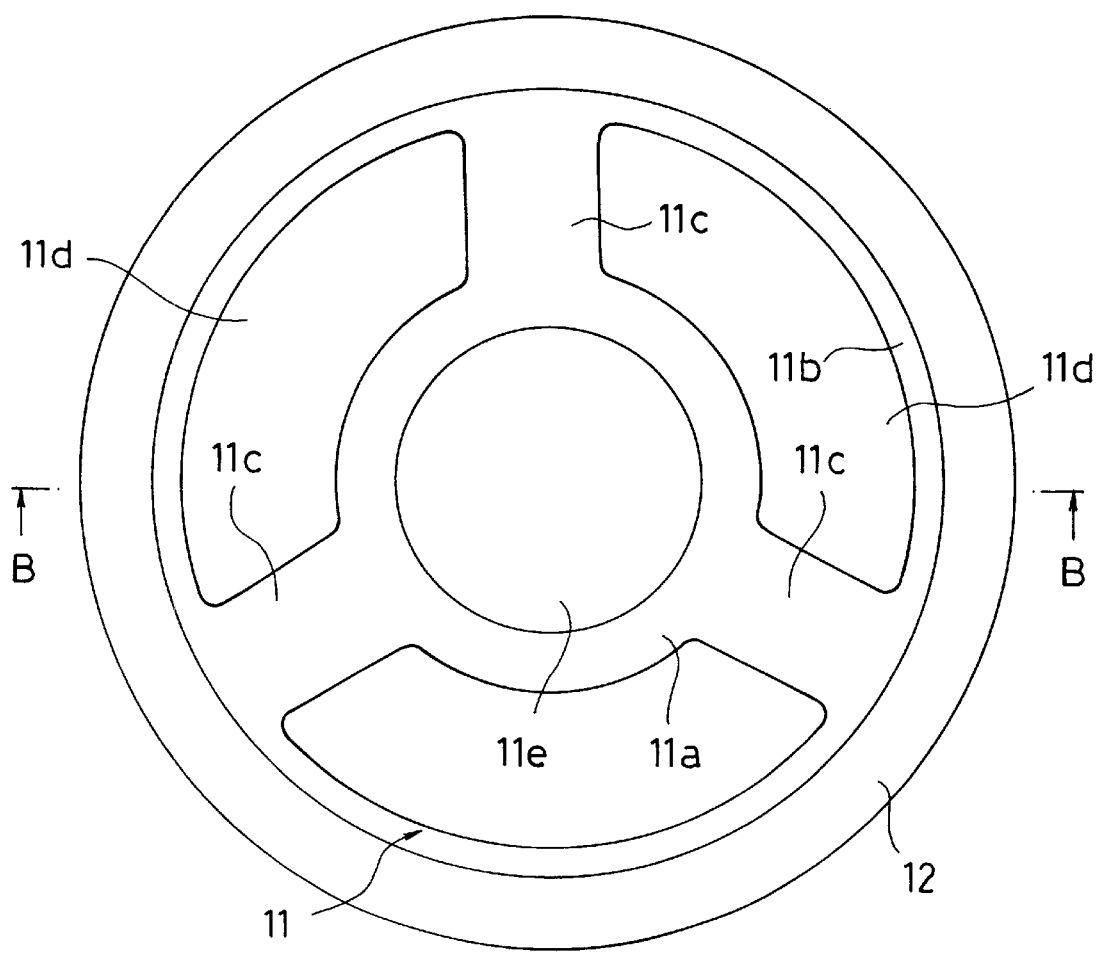
FIG. 3 is a schematic pan view of the disk-shaped leaf spring of the embodiment of FIG. 1 provided with an outer peripheral seal.
Figure 4:
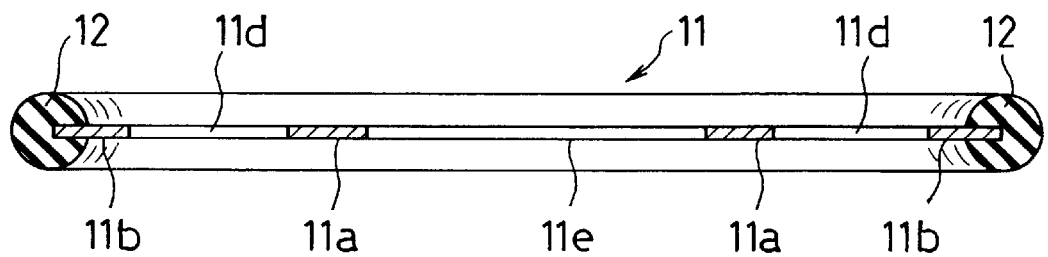
FIG. 4 is a schematic cross sectional view of the leaf spring taken long line B—B in FIG. 4.

Referring to FIG. 1 showing a preferred embodiment of valve element according to the invention, the valve element 10 comprises a disk-shaped leaf spring 11 made from a thin steel plate, which includes a center hub section 11a, an outer peripheral ring section 11b and a plurality of radial arm sections 11c connected to the hub section 11a and the outer peripheral ring section 11b, and a total of three openings lid are formed between the hub section 11a and the outer peripheral ring section 11b as shown in FIGS. 3 and 4. A central hole lie is cut through the hub section 11a.

An outer peripheral seal 12 having a substantially circular cross section is formed around the outer periphery of the leaf spring 11 by vulcanizing and molding an elastic material such as rubber and rigidly secured to the leaf spring 11. More specifically, the outer peripheral seal 12 is made of acrylonitrile-butadiene rubber (NBR). The valve element 10 is securely fitted to the valve housing of a solenoid valve as its outer peripheral seal 12 is held by the valve housing.

Figure 5:
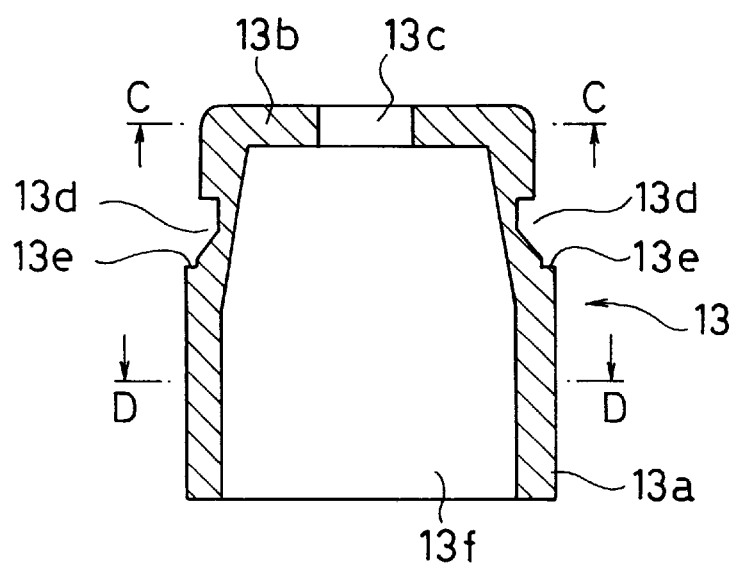
FIG. 5 is a schematic plan view of the movable core shown in FIG. 2.
Figure 6:
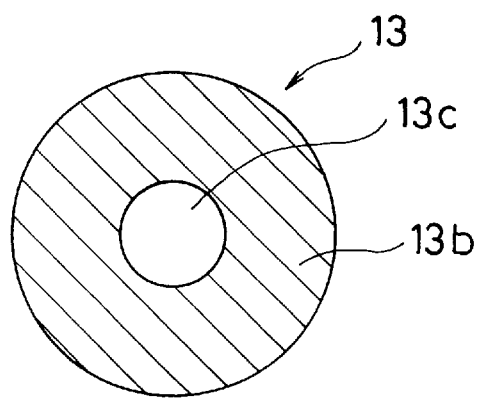
FIG. 6 is a schematic cross sectional view of the movable core taken along line C—C in FIG. 5.
Figure 7:
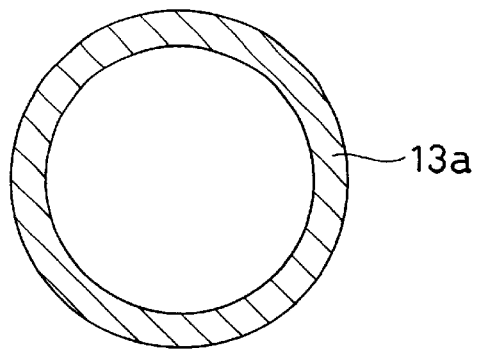
FIG. 7 is a schematic cross sectional view of the movable core taken along line D—D in FIG. 5.
Figure 8:
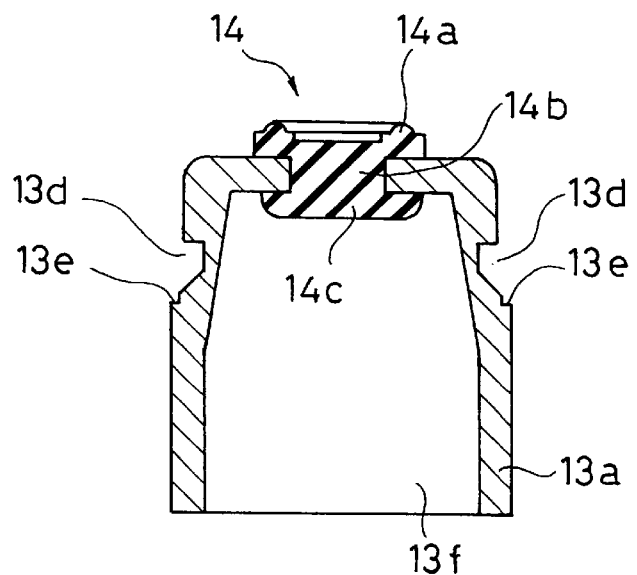
FIG. 8 is a schematic cross sectional view of the movable core provided with a valve seal.
Figure 9:
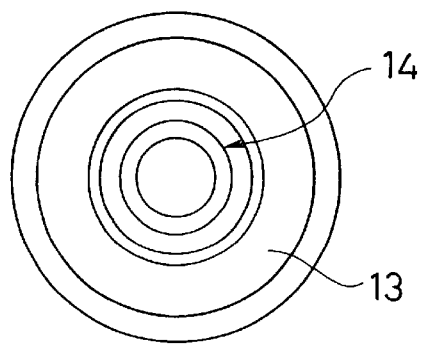
FIG. 9 is a schematic plan view of the movable core of FIG. 8 provided with a valve seal.

As shown in FIG. 5, the movable core 13 includes a cylindrical section 13a and an end wall section 13b arranged at an end thereof and shows a cup-shaped cross section. A through hole 13c is cut through an central area of the end wall section 13b of the movable core 13 and an annular groove 13d is formed on the outer periphery of the cylindrical section 13a. A stepped section 13e is formed in the groove 13d and used for aligning the leaf spring 11. The movable core 13 had a cabinet 13f in the inside thereof for containing a spring therein when the valve element 10 is mounted into a solenoid valve.

A valve seal 14 is formed through vulcanization and molding and fitted to the end wall section 13b. The valve seal 14 is made of fluorine rubber, which is more expensive than NBR. However, for the purpose of the invention, the volume of expensive fluorine rubber necessary for molding is limited so that the valve element 10 can be manufactured at low cost because the valve seal 14 is only fitted to the end wall section 13b of the movable core 13 and hence it is sufficient for the valve seal 14 to have a size large enough for sealing the valve seat. The valve seal includes a main body section 14a arranged on the outer lateral surface of the end wall section 13b, a small diameter section 14b held in engagement with the through hole 13c and a large diameter section 14c arranged on the inner surface of the end wall section 13b and is formed integrally by vulcanization and molding. The surface of the main body section 14a of the valve seal 14 may be coated with fluorine resin such as polytetrafluoroethylene (PTFE) in order to improve the friction resistance of the sealing surface.

A holder ring 15 made of thermal plastic resin is held in engagement with the groove 13d of the movable core 13 so that the leaf spring 11 is rigidly secured to the movable core 13 by the holder ring 15.

Now, a method of manufacturing a valve element 10 according to the invention will be described below.

A leaf spring 11 including an outer peripheral ring section 11b, a hub section 11a having a central hole 11e and three radial arm sections 11c connecting the outer peripheral section 11b and the hub section 11a is formed by press-molding using a press machine (not shown). Thus, the obtained leaf spring 11 shows a configuration as shown in FIGS. 1 through 7.

An outer peripheral seal 12 is formed around the outer peripheral section of the leaf spring 11 by vulcanizing and molding an elastic material such as rubber, NBR for example, using a rubber molding metal mold (not shown) arranged around the leaf spring 11. As a result, the leaf spring 11 is manufactured to have the outer peripheral seal 12 rigidly secured thereto.

A movable core 13 is firstly formed by press molding, forging or casting to produce a cylindrical section 13a and an end wall section 13b and to show a cup-shaped cross section and subsequently machined to produce a groove 13d on the outer periphery of the cylindrical section 13a.

Then, a valve seal 14 is formed on the end wall section 13b of the movable core 13 by vulcanizing and molding an elastic material such as rubber, fluorine rubber for example, in a rubber molding metal mold (not shown) in which the movable core 13 is placed in position. The main body section 14a of the valve seal 14 arranged on the outer surface side of the end wall section 13b and the large diameter holding section 14c of the valve seal 14 arranged on the inner surface side of the end wall section 13b are connected by a small diameter section 14b, which sections are formed integrally through vulcanization and molding.

Now, the process of assembling the leaf spring 11 carrying the outer peripheral seal 12 and the movable core 13 carrying the valve seal 14 by means of a holder ring 15 will be described by referring to FIG. 10.

Figure 10:
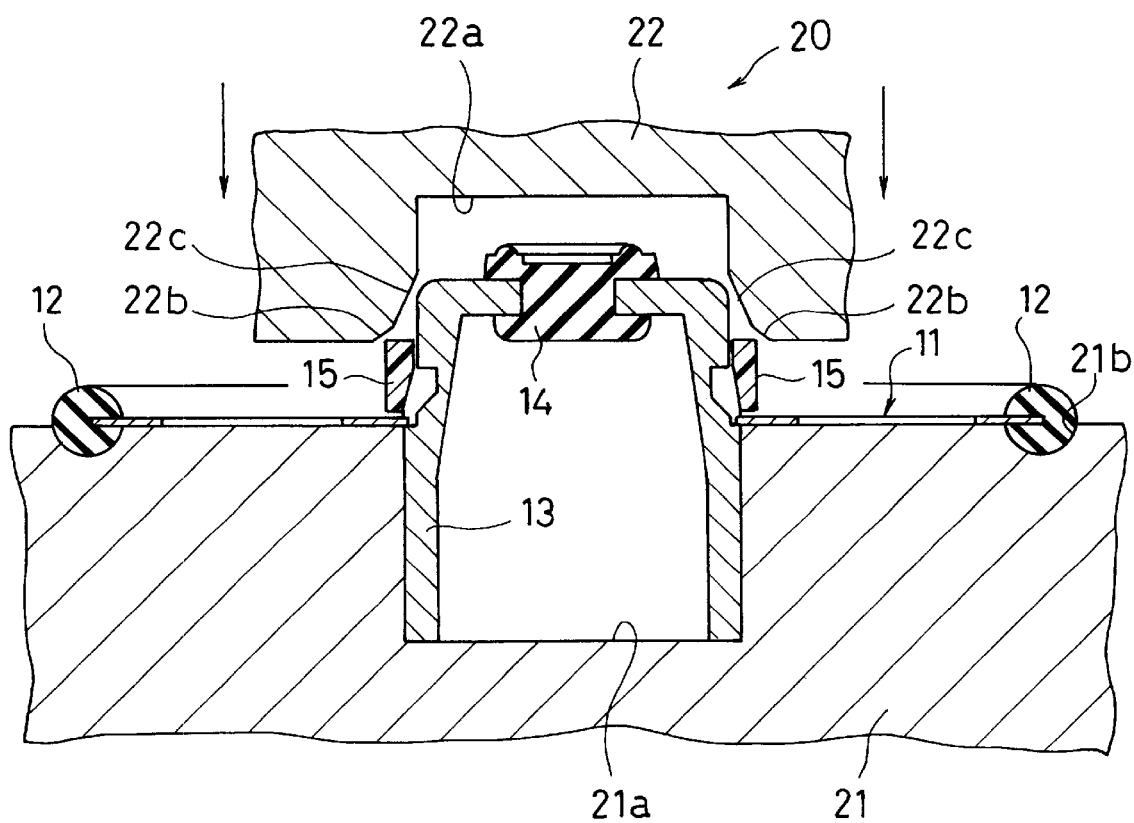
FIG. 10 is a schematic cross sectional view of a thermal caulking metal mold for rigidly securing the movable core to the leaf spring by means of a holder ring.

The thermal caulking metal mold 20 shown in FIG. 10 comprises a die 21 and a punch 22, and the die 21 has a recess 21a for receiving a movable core 13 and an annular recess 21b for receiving an outer peripheral seal 12. As seen from FIG. 10, the punch 22 can be moved toward and away from the die 21 by means of a pneumatically operated press machine (not shown) and is provided in the inside with a heater. The punch 22 has a recess 22a for receiving the end wall side of the movable core 13, said recess 22a having a first slope 22b of a small angle of inclination arranged near the opening of the recess 22a and a second slope 22c of a large angle of inclination extending from the first slope 22b.

The movable core 13 is placed in position in the recess 21a with its opening side facing downward, while the portion of the leaf spring 11 carrying the outer peripheral seal 12 is placed in position in the recess 21b. Thus, both the movable core 13 and the leaf spring 11 are placed in position in the die 21 of the metal mold 20.

Figure 2:
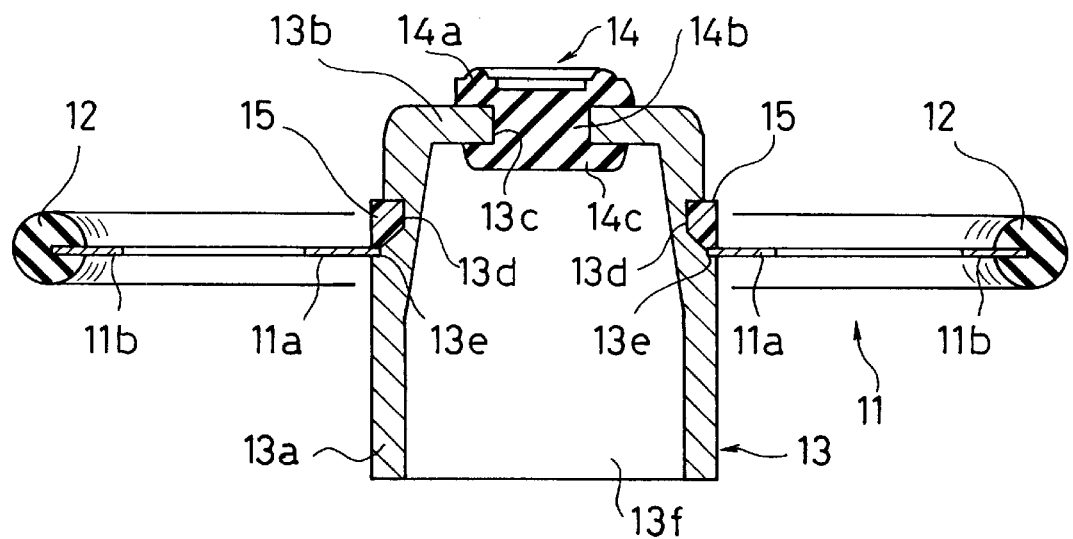
FIG. 2 is a schematic cross sectional view of the embodiment of FIG. 1 taken along line A—A in FIG. 1.

The holder ring 15 made of thermal plastic resin is preliminarily heated to make it easily deformed and then fitted to the outer periphery of the movable core 13 from the side of the end wall 13b. As the punch 22 is moved toward the die 21 under this condition, the angular section of the upper surface of the holder ring 15 is pushed inwardly by the first slope 22b of the punch 22 and then further pushed inwardly by the second slope 22c. Thus, when the punch 22 is completely moved to the position closest to the die 21, the holder ring 15 is tightly held into engagement with the groove 13d of the movable coil 13 as shown in FIG. 2.

When the lower surface of the punch 22 comes closest to the die 21, any excessive part of the holder ring 15 is guided by the first slope 22b and moved outside of the groove.

Since the outer peripheral seal 12 is formed on the leaf spring 11 through vulcanization and molding, while the valve seal 14 is formed on the end wall section 13b of the movable core 13 also through vulcanization and molding, the outer peripheral seal 12 may be made of less expensive NBR, and the valve seal 14 may be made of expensive rubber such as fluorine rubber.

Figure 11:
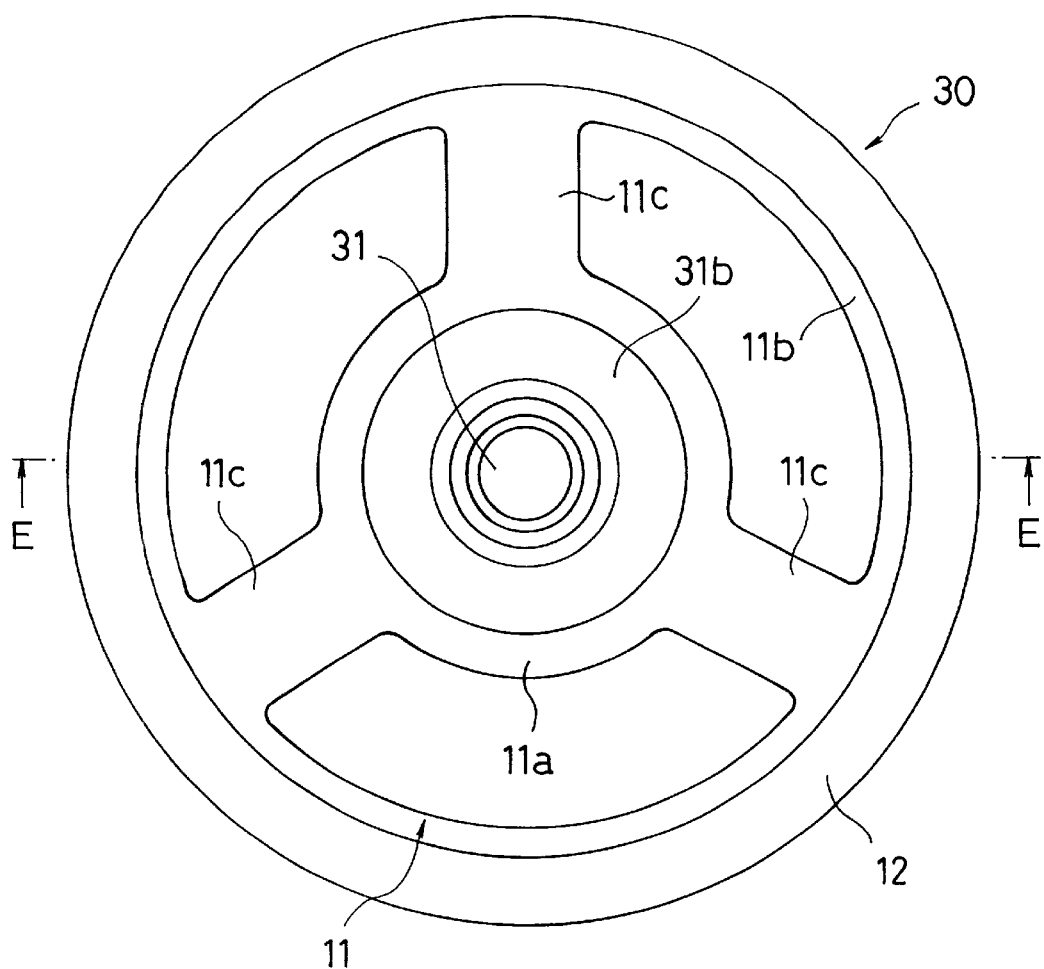
FIG. 11 is a schematic plan view of a known valve element shown for the purpose of comparison.
Figure 12:
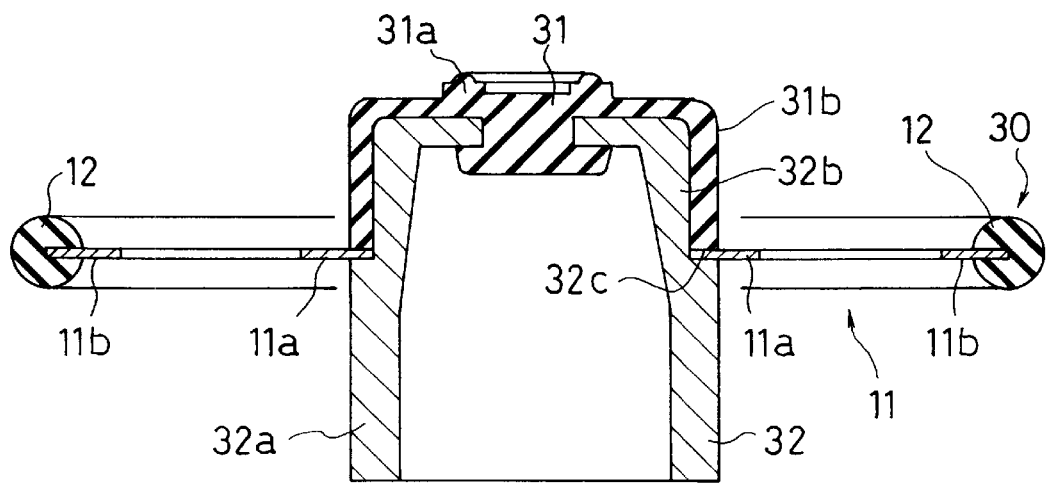
FIG. 12 is a schematic cross sectional view of the valve element of FIG. 11 taken along line E—E in FIG. 11.

FIGS. 11 and 12 schematically illustrate a known valve element 30 shown for the purpose of comparison. In the course of inventing a valve element according to the invention, the inventor firstly looked into a technique of securing a movable core 32 to a leaf spring 11 having a configuration similar to the leaf spring 11 of the above embodiment by means of a valve seal 31 in this valve element 30.

The movable core 32 has a large diameter section 32a and a small diameter section 32b, and the leaf spring 11 is brought into contact with a stepped section 32c of the large diameter section 32a. The valve seal 31 has a main body section 31a to be held in contact with a valve seat and a holder section 31b integral with the main body section 31a and adapted to entirely cover the small diameter section 32b of the movable core. In the case of this valve element 30, expensive fluorine rubber has to be used for the holder section 31b as well as for the main body section 31a of the valve seal 31 to increase the volume of expensive fluorine rubber to be consumed for a valve element. Additionally, it is difficult to improve the holding strength of the movable core 32 relative to the leaf spring 11 to which it is directly fitted by means of rubber.

To the contrary, in the case of a valve element 10 according to the invention, the movable core 13 is fitted to the leaf spring 11 by means of a resin-made holder ring 15 to improve the holding strength of the movable core relative to the leaf spring. Additionally, since a rubber-made valve seal 14 is formed only on the end wall section 13b of the movable core 13 through vulcanization and molding, the volume of rubber to be used for the valve element can be reduced to manufacture the valve element 10 with lower cost even if expensive fluorine rubber is used for the valve seal 14.

While the present invention is described above by way of a preferred embodiment thereof, the present invention is by no means limited thereto and the illustrated embodiment may be modified in various different ways without departing from the scope of the invention. For example, the valve seal 14 is made of expensive fluorine rubber in the above embodiment and it may alternatively be made of some other rubber. Similarly, while the leaf spring 11 has three radially arranged arm sections 11c in the above embodiment, any appropriate number of arm sections 11c may be used for the purpose of the invention.

What is claimed is:

1. A valve element adapted to be arranged in a solenoid valve to open and close a valve seat, said valve element comprising:

a leaf spring including an outer peripheral ring section, a hub section having a central hole, and a plurality of radial arm sections for connecting between said outer peripheral ring section and said hub section;

a ring-shaped outer peripheral seal formed by vulcanizing and molding an elastic material along said outer peripheral ring section;

a movable core having a cup-shaped cross section, said movable core including a cylindrical section and an end wall section, said end wall section being arranged at an end of the cylindrical section and having a central through hole, said cylindrical section having on its outer periphery a ring-shaped stepped section to be held in contact with said leaf spring and said cylindrical section having a groove section which is formed to be radially inwardly extending from said ring-shaped stepped section;

a valve seal arranged at said end wall section and having a main body section disposed on an outer surface of said end wall section, a small diameter section disposed in said through hole and a holding section located on an inner surface of said end wall section and connected to said main body section by way of the small diameter section; and a holder ring made of thermoplastic resin and held in engagement with said groove section by thermal caulking;

said leaf spring and said movable core being rigidly secured to each other by means of said holder ring.

* * * * *